United States Patent
Hooli et al.

(10) Patent No.: US 11,477,818 B2
(45) Date of Patent: Oct. 18, 2022

(54) UPLINK BANDWIDTH PART SWITCHING ON NEW RADIO UNLICENSED

(71) Applicant: Nokia Technologies Oy, Espoo (FI)

(72) Inventors: Kari Hooli, Oulu (FI); Esa Tiirola, Kempele (FI); Timo Lunttila, Espoo (FI); Antti Piipponen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 17/045,464

(22) PCT Filed: Apr. 6, 2018

(86) PCT No.: PCT/IB2018/052413
§ 371 (c)(1),
(2) Date: Oct. 5, 2020

(87) PCT Pub. No.: WO2019/193402
PCT Pub. Date: Oct. 10, 2019

(65) Prior Publication Data
US 2021/0058964 A1 Feb. 25, 2021

(51) Int. Cl.
*H04W 74/00* (2009.01)
*H04W 72/04* (2009.01)
(Continued)

(52) U.S. Cl.
CPC ....... *H04W 74/008* (2013.01); *H04W 72/042* (2013.01); *H04W 72/0446* (2013.01);
(Continued)

(58) Field of Classification Search
CPC ............. H04W 74/008; H04W 72/042; H04W 72/0446; H04W 72/0453; H04W 72/14; H04W 74/0808
See application file for complete search history.

(56) References Cited

U.S. PATENT DOCUMENTS

2016/0302092 A1\* 10/2016 Sartori .................. H04L 5/0064
2018/0132264 A1\* 5/2018 Jung .................. H04W 72/1268
(Continued)

OTHER PUBLICATIONS

Office action received for corresponding Japanese Patent Application No. 2020-554877, dated Dec. 20, 2021, 7 pages of office action and no page of translation available.
(Continued)

*Primary Examiner* — Jael M Ulysse
(74) *Attorney, Agent, or Firm* — Nokia Technologies Oy

(57) ABSTRACT

In accordance with an example embodiment of the invention there is at least a method and apparatus to perform determining, by a network node, that at least one of frequency tuning, bandwidth part switching, or bandwidth switching is to be performed by at least one user equipment; and based on the determining, sending, by the network node, to the at least one user equipment one or more downlink slots, wherein the one or more downlink slots provide an indication of a time to perform the at least one of frequency toning, bandwidth part switching, or bandwidth switching by the at least one user equipment. Further, in accordance with another example embodiment of the invention there is at least a method and apparatus to perform receiving from a network node, by a user equipment, one or more downlink slots, wherein the one or more downlink slots comprises at least one of an uplink grant, a downlink assignment, and wherein the one or more downlink slots provide an indication of a time to perform at least one of a frequency tuning, bandwidth part switching, and bandwidth switching by at least one user equipment; based on the one or more downlink slots, performing, by the user equipment, the at least one of frequency tuning, bandwidth part switching, or bandwidth switching, and transmitting, by the user equipment, at least one uplink channel or a signal via a radio frequency chain
(Continued)

based on the at least one of frequency tuning, bandwidth part switching, or bandwidth switching.

20 Claims, 6 Drawing Sheets

(51) Int. Cl.
*H04W 72/14* (2009.01)
*H04W 74/08* (2009.01)

(52) U.S. Cl.
CPC ....... *H04W 72/0453* (2013.01); *H04W 72/14* (2013.01); *H04W 74/0808* (2013.01)

(56) References Cited

U.S. PATENT DOCUMENTS

| | | | | |
|---|---|---|---|---|
| 2018/0368112 | A1* | 12/2018 | Sebeni | H04W 76/28 |
| 2019/0059112 | A1* | 2/2019 | Ou | H04W 74/0833 |
| 2019/0132857 | A1* | 5/2019 | Babaei | H04W 72/1252 |
| 2019/0141546 | A1* | 5/2019 | Zhou | H04W 72/1294 |
| 2019/0149305 | A1* | 5/2019 | Zhou | H04L 1/0026 370/330 |
| 2019/0149380 | A1* | 5/2019 | Babaei | H04W 72/1268 370/330 |
| 2019/0207662 | A1* | 7/2019 | Zhou | H04L 5/0048 |
| 2019/0215048 | A1* | 7/2019 | Cirik | H04B 7/088 |
| 2019/0215847 | A1* | 7/2019 | Abdoli | H04W 72/1263 |
| 2019/0253531 | A1* | 8/2019 | Basu Mallick | H04L 69/22 |
| 2019/0254056 | A1* | 8/2019 | Salah | H04W 72/0446 |
| 2019/0312635 | A1* | 10/2019 | Ang | H04L 5/001 |
| 2019/0313454 | A1* | 10/2019 | Pu | H04W 28/20 |
| 2020/0059345 | A1* | 2/2020 | Pelletier | H04L 1/0026 |
| 2020/0221428 | A1* | 7/2020 | Moon | H04W 16/28 |
| 2020/0329523 | A1* | 10/2020 | Yi | H04W 72/048 |
| 2020/0344819 | A1* | 10/2020 | Myung | H04W 74/0841 |

OTHER PUBLICATIONS

"High Level Views on NR-U BWP", 3GPP TSG RAN WG1 Meeting 91, R1-1720475, Agenda : 7.8, Sony, Nov. 27-Dec. 2, 2017, pp. 1-4.
"(E)PDCCH for LAA downlink", 3GPP TSG RAN WG1 Meeting #81, R1-152648, Agenda : 6.2.4.3, Intel Corporation, May 25-29, 2015, pp. 1-6.
"Channel access mechanisms for NR unlicensed", 3GPP TSG RAN WG1 Meeting #92, R1-1802125, Agenda : 7.6.5, OPPO, Feb. 26-Mar. 2, 2018, 3 pages.
"Remaining Details on Bandwidth Part Operation in NR", 3GPP TSG RAN WG1 Meeting #92, R1-1801638, Agenda 7.1.3.4.1, MediaTek Inc, Feb. 26-Mar. 2, 2018, 11 pages.
"Remaining Issues on BWP", 3GPP TSG RAN WG1 Meeting #92, R1-1802844, Agenda : 7.1.3.4.1, Qualcomm Incorporated, Feb. 26-Mar. 2, 2018, pp. 1-24.
"Way forward on UL DCI-Triggered CSIRS resource set fortracking", 3GPP TSG RAN WG1 Meeting #92, R1-1803434, Agenda : 7.1.2.3.6, Qualcomm, Feb. 26-Mar. 2, 2018, 8 pages.
"Ambiguities about beam indication and aperiodic CSI-RS triggering offset configuration in some cases", 3GPP TSG RAN WG1 Meeting #92, R1-1801892, Agenda : 7.1.2.2.3, Fujitsu, Feb. 26-Mar. 2, 2018, pp. 1-9.
"3rd Generation Partnership Project; Technical Specification Group Radio Access Network; NR; Multiplexing and channel coding (Release 15)", 3GPP TS 38.212, V15.0.0, Dec. 2017, pp. 1-82.
"New SID on NR-based Access to Unlicensed Spectrum", 3GPP TSG RAN Meeting #75, RP-170828, Agenda : 9.1, Qualcomm, Mar. 6-9, 2017, 5 pages.
"Potential Solutions and Techniques for NR Unlicensed", 3GPP TSG RAN WG1 Meeting #92, R1-1802526, Agenda : 7.6.4, Nokia, Feb. 26-Mar. 2, 2018, 10 pages.
"3rd Generation Partnership Project; Technical Specification Group Radio Access Network; Study on Licensed-Assisted Access to Unlicensed Spectrum; (Release 13)", 3GPP TR 36.889, V13.0.0, Jun. 2015, 285 pages.
LS on BWP switching delay, 3GPP TSG-RAN WG4 Meeting #86, R4-1803283, Intel Corporation, Feb. 26-Mar. 12, 2018, 2 pages.
"Revised SID on NR-based Access to Unlicensed Spectrum", 3GPP TSG RAN Meeting #77, RP-172021, Agenda 9.3.3, Qualcomm Incorporated, Sep. 11-14, 2017, 5 pages.
International Search Report and Written Opinion received for corresponding Patent Cooperation Treaty Application No. PCT/IB2018/052413, dated Nov. 14, 2018, 16 pages.
"Remaining details on UL/DL Resource Allocation", 3GPP TSG RAN WG1 Meeting R1-92, R1-1801681, Agenda : 7.1.3 3.1, MediaTek Inc , Feb. 26-Mar. 2, 2018, pp. 1-10.
"Summary of Remaining Issues on Bandwidth part and Wideband Operation", 3GPP TSG RAN WG1 Meeting #92, R1-1801347, Feb. 26-Mar. 2, 2018, 14 pages.
"Details on BWP Switching Operation", 3GPP TSG-RAN WG4 Meeting #86, R4-1802834, Agenda : 7.1.6, Huawei, Feb. 26-Mar. 2, 2018, 10 pages.
"NR Frame Structure on Unlicensed Bands", 3GPP TSG RAN WG1 Meeting #92, R1-1801370, Agenda : 7.6.5, Huawei, Feb. 26-Mar. 2, 2018, 8 pages.
"BWP Switch Timeline", 3GPPRAN4#86, R4-1802270, Agenda : 7.1.6, Qualcomm Incorporated, Feb. 26-Mar. 2, 2018, 4 pages.
Office action received for corresponding European Patent Application No. 18720018.3, dated Sep. 24, 2021, 7 pages.
Office action received for corresponding European Patent Application No. 18720018.3, dated Mar. 22, 2022, 4 pages.
Final Rejection received for corresponding Japanese Patent Application No. 2020-554877, dated Jul. 6, 2022, 1 page of office action and no page of translation available.

* cited by examiner

|          | 1  | 2  | 3  | 4  | 5  | 6  | 7  | 8  |
|----------|----|----|----|----|----|----|----|----|
| 60 kHz SCS | 20 | 20 | 20 | 20 | 20 | 20 | 20 | 20 |
| 30 kHz SCS | 20 | 20 | 20 | 20 |    |    |    |    |
| 15 kHz SCS | 20 | 20 |    |    |    |    |    |    |

FIG. 1

|             | subbands |   |   |   |
|-------------|---|---|---|---|
|             | a | b | c | d |
| 1 sub-band  | x |   |   |   |
|             |   | x |   |   |
|             |   |   | x |   |
|             |   |   |   | x |
| 2 subbands  | x | x |   |   |
|             |   | x | x |   |
|             |   |   | x | x |
| 3 subbands  | x | x | x |   |
|             |   | x | x | x |
| 4 subbands  | x | x | x | x |

FIG. 2

UPLINK BANDWIDTH PART SWITCHING ON NEW RADIO UNLICENSED

RELATED APPLICATION

This application claims priority to PCT Application No PCT/IB2018/052413, filed on Apr. 6, 2018, of which is incorporated herein by reference in its entirety.

TECHNICAL FIELD

The teachings in accordance with example embodiments of this invention can relate generally to user equipment bandwidth part switching for uplink transmission and, more specifically, relate to user equipment bandwidth part switching for uplink transmission in New Radio unlicensed band scenarios.

BACKGROUND

This section is intended to provide a background or context to example embodiments of the invention that as may be recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the figures are herewith defined as follows:
ACK acknowledgement
ARQ automatic repeat request
BW bandwidth
BWP bandwidth part
CA carrier aggregation
CC component carrier
CCA clear channel assessment
CORESET control resource set
COT channel occupancy time
CSI-RS channel state information reference signal
DCI downlink control information
DL downlink
DMRS demodulation reference signal
eNB enhanced Node B (LTE base station)
FDMA frequency division multiple access
FFT fast Fourier Transformation
GC-PDCCH group-common physical downlink control channel
gNB NR base station
HARQ hybrid automatic repeat request
LAA licensed assisted access
LBT listen before talk
LTE long term evolution
MCS modulation and coding scheme
NR New Radio
NR-U New Radio Unlicensed
OFDM orthogonal frequency domain multiplexing
PDCCH physical downlink control channel
PDSCH physical downlink shared channel
PSS primary synchronization signal
PUCCH physical uplink control channel
PUSCH physical uplink shared channel
RF Radio Frequency
RRC radio resource control
SCS subcarrier spacing
SSS secondary synchronization signal
TDD time division duplexing
UE user equipment
UL uplink There are several wide unlicensed bands and even a single base station, gNB, or a UE can occasionally access very wide bandwidths. Hence, wideband operation is one of the key building blocks for new radio (NR) communications.

Example embodiments of the invention at least work to improve wideband operation for NR, such as in unlicensed bands.

SUMMARY

In an exemplary aspect of the invention, there is a method comprising determining, by a network node, that at least one of frequency tuning, bandwidth part switching, or bandwidth switching is to be performed; and based on the determining, sending, by the network node, to the at least one user equipment one or more downlink slots, wherein the one or more downlink slots provide an indication of a time to perform the at least one of frequency tuning, bandwidth part switching, or bandwidth switching.

A further example embodiment is a method comprising the method of the previous paragraph, wherein the one or more downlink slots are part of a transmission burst, wherein the transmission burst further comprises one or more empty symbols or slots, and an uplink portion with one or more uplink slots; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, wherein the one or more downlink slots further comprise a start time for an uplink part of a channel occupancy time when bandwidth parameters for the at least one of frequency tuning, bandwidth part switching, or bandwidth switching are taken into use; and/or wherein the duration indication comprising the gap between the start time and the end time is based on a length of time in terms of at least one of microseconds, OFDM symbols, mini-slots or slots of the one or more downlink slots; and/or wherein the time indicated to perform the at least one of frequency tuning, bandwidth part switching, or bandwidth switching is before or after a reception of the scheduled physical downlink shared channel at the at least one user equipment; and/or wherein the downlink control information comprises at least one bit field to indicate the time to perform the at least one of frequency tuning, bandwidth part switching, or bandwidth switching.

In another example aspect of the invention, there is an apparatus comprising: means for determining, by a network node, that at least one of frequency tuning, bandwidth part switching, or bandwidth switching is to be performed; and means, based on the determining, for sending, by the network node, to the at least one user equipment one or more downlink slots, wherein the one or more downlink slots provide an indication of a time to perform the at least one of frequency tuning, bandwidth part switching, or bandwidth switching.

A further example embodiment is an apparatus as in the prior paragraph, wherein the one or more downlink slots are part of a transmission burst, wherein the transmission burst further comprises one or more empty symbols or slots, and an uplink portion with one or more uplink slots; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, wherein the one or more downlink slots further comprise a start time for an uplink part of a channel occupancy time when bandwidth parameters for the at least one of frequency tuning, bandwidth part switching, or bandwidth switching are taken into use; and/or wherein the duration indication comprising the gap between the start time and the end time is based on a length of time in terms of at least one of microseconds, OFDM symbols, mini-slots or slots of the one or more downlink slots; and/or wherein the time indicated to perform the at least one of frequency tuning, bandwidth part switching, or bandwidth switching is before or after a reception of the scheduled physical downlink shared channel at the at least one user equipment; and/or wherein the downlink control information comprises at least one bit field to indicate the time to perform the at least one of frequency tuning, bandwidth part switching, or bandwidth switching.

In accordance with example embodiments according to the paragraph above, at least the means for determining and sending comprises a non-transitory computer readable medium [MEM 22B as in FIG. 5] encoded with a computer program [PROG 22C as in FIG. 5] executable by at least one processor [DP 22A and/or Resource Module 22G as in FIG. 5].

In an example aspect of the invention, there is an apparatus, such as a network node or network side apparatus, comprising: at least one processor; and at least one memory including computer program code, where the at least one memory and the computer program code are configured, with the at least one processor, to cause the apparatus to at least: determine, by a network node, that at least one of frequency tuning, bandwidth part switching, or bandwidth switching is to be performed; and based on the determining, send, by the network node, to at least one user equipment one or more downlink slots, wherein the one or more downlink slots provide an indication of a time to perform the at least one of frequency tuning, bandwidth part switching, or bandwidth switching.

A further example embodiment is an apparatus as in the prior paragraph, wherein the one or more downlink slots are part of a transmission burst, wherein the transmission burst further comprises one or more empty symbols or slots, and an uplink portion with one or more uplink slots; and/or wherein the one or more downlink slots comprise a duration indication for the at least one of frequency tuning, bandwidth part switching, or bandwidth switching, wherein the duration indication comprises a gap between a start time and an end tune for the at least one of frequency tuning, bandwidth part switching, or bandwidth switching by the at least one user equipment, wherein the one or more downlink slots further comprise a start time for an uplink part of a channel occupancy time when bandwidth parameters for the at least one of frequency tuning, bandwidth part switching, or bandwidth switching are taken into use; and/or wherein the duration indication comprising the gap between the start time and the end time is based on a length of time in terms of at least one of microseconds, OFDM symbols, mini-slots or slots of the one or more downlink slots; and/or wherein the time indicated to perform the at least one of frequency tuning, bandwidth part switching, or bandwidth switching is before or after a reception of the scheduled physical downlink shared channel at the at least one user equipment; and/or wherein the downlink control information comprises at least one bit field to indicate the time to perform the at least one of frequency tuning, bandwidth part switching, or bandwidth switching.

In another example aspect of the invention, there is a method comprising receiving from a network node, by a user equipment, one or more downlink slots, wherein the one or more downlink slots comprises at least one of an uplink grant, a downlink assignment, and wherein the one or more downlink slots provide an indication of a time to perform at least one of a frequency tuning, bandwidth part switching, and bandwidth switching by at least one user equipment; and based on the one or more downlink slots, performing, by the user equipment, the at least one of frequency tuning, bandwidth part switching, or bandwidth switching, and transmitting, by the user equipment, at least one uplink channel or a signal via a radio frequency chain based on the at least one of frequency tuning, bandwidth part switching, or bandwidth switching.

A further example embodiment is a method comprising the method of the previous paragraph, wherein the one or more downlink slots are part of a transmission burst, wherein the transmission burst further comprises one or more empty symbols or slots, and an uplink portion with one or more uplink slots; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time for an uplink part of a channel occupancy time when bandwidth parameters for the at least one of frequency tuning, bandwidth part switching, or bandwidth switching are taken into use; and/or wherein the duration indication comprising the gap between the start time and the end time is based on a length of time in terms of at least one of microseconds, OFDM symbols, mini-slots or slots of the one or more downlink slots; and/or wherein the time indicated to perform the at least one of frequency tuning, bandwidth part switching, or bandwidth switching is before or after a reception of the scheduled physical downlink shared channel at the at least one user equipment; and/or wherein the downlink control information comprises at least one bit field to indicate the time to perform the at least one of frequency tuning, bandwidth part switching, or bandwidth switching; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time for an uplink part of a channel occupancy time when bandwidth parameters for the at least one of frequency tuning, bandwidth part switching, or bandwidth switching are taken into use; and/or wherein the at least one reference signal comprises at least one of aperiodic channel state information reference signal, additional primary synchronization signal, or additional secondary synchronization signal; and, the at least one additional reference signal comprises at least one of aperiodic channel state information reference signal, additional primary synchronization signal, or additional secondary synchronization signal; and/or wherein the time indicated to perform the at least one of frequency tuning, bandwidth part switching, or bandwidth switching is before or after a reception of the scheduled physical downlink shared channel at the user equipment.

In another example aspect of the invention, there is an apparatus comprising: means for receiving from a network node, by a user equipment, one or more downlink slots, wherein the one or more downlink slots comprises at least one of an uplink grant, a downlink assignment, and wherein the one or more downlink slots provide an indication of a time to perform at least one of a frequency tuning, bandwidth part switching, and bandwidth switching by at least one user equipment; means, based on the one or more downlink slots, for performing, by the user equipment, the at least one of frequency tuning, bandwidth part switching, or bandwidth switching, and means for transmitting, by the user equipment, at least one uplink channel or a signal via a radio frequency chain based on the at least one of frequency tuning, bandwidth part switching, or bandwidth switching.

A further example embodiment is an apparatus as in the prior paragraph, wherein the one or more downlink slots are part of a transmission burst, wherein the transmission burst further comprises one or more empty symbols or slots, and an uplink portion with one or more uplink slots; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time for an uplink part of a channel occupancy time when bandwidth parameters for the at least one of frequency tuning, bandwidth part switching, or bandwidth switching are taken into use; and/or wherein the duration indication comprising the gap between the start time and the end time is based on a length of time in terms of at least one of microseconds, OFDM symbols, mini-slots or slots of the one or more downlink slots; and/or wherein the time indicated to perform the at least one of frequency tuning, bandwidth part switching, or bandwidth switching is before or after a reception of the scheduled physical downlink shared channel at the at least one user equipment; and/or wherein the downlink control information comprises at least one bit field to indicate the time to perform the at least one of frequency tuning, bandwidth part switching, or bandwidth switching; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time for an uplink part of a channel occupancy time when bandwidth parameters for the at least one of frequency tuning, bandwidth part switching, or bandwidth switching are taken into use; and/or wherein the at least one reference signal comprises at least one of aperiodic channel state information reference signal, additional primary synchronization signal, or additional secondary synchronization signal; and, the at least one additional reference signal comprises at least one of aperiodic channel state information reference signal, additional primary synchronization signal, or additional secondary synchronization signal; and/or wherein the time indicated to perform the at least one of frequency tuning, bandwidth part switching, or bandwidth switching is before or after a reception of the scheduled physical downlink shared channel at the user equipment.

In an example aspect of the invention, there is an apparatus, such as a user equipment apparatus, comprising: at least one processor; and at least one memory including computer program code, where the at least one memory and the computer program code are configured, with the at least one processor, to cause the apparatus to at least: receive from a network node, by a user equipment, one or more downlink slots, wherein the one or more downlink slots comprises at least one of an uplink grant, a downlink assignment, and wherein the one or more downlink slots provide an indication of a time to perform at least one of a frequency tuning, bandwidth part switching, and bandwidth switching by at least one user equipment; based on the one or more downlink slots, perform, by the user equipment, the at least one of the frequency tuning, bandwidth part switching, and bandwidth switching, and transmit, by the user equipment, at least one uplink channel or a signal via a radio frequency chain based on the at least one of frequency tuning, bandwidth part switching, or bandwidth switching.

A further example embodiment is an apparatus as in the prior paragraph, wherein the one or more downlink slots are part of a transmission burst, wherein the transmission burst further comprises one or more empty symbols or slots, and an uplink portion with one or more uplink slots; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time for an uplink part of a channel occupancy time when bandwidth parameters for the at least one of frequency tuning, bandwidth part switching, or bandwidth switching are taken into use; and/or wherein the duration indication comprising the gap between the start time and the end time is based on a length of time in terms of at least one of microseconds, OFDM symbols, mini-slots or slots of the one or more downlink slots; and/or wherein the time indicated to perform the at least one of frequency tuning, bandwidth part switching, or bandwidth switching is before or after a reception of the scheduled physical downlink shared channel at the at least one user equipment; and/or wherein the downlink control information comprises at least one bit field to indicate the time to perform the at least one of frequency tuning, bandwidth part switching, or bandwidth switching; and/or wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time for an uplink part of a channel occupancy time when bandwidth parameters for the at least one of frequency tuning, bandwidth part switching, or bandwidth switching are taken into use; and/or wherein the at least one reference signal comprises at least one of aperiodic channel state information reference signal, additional primary synchronization signal, or additional secondary synchronization signal; and, the at least one additional reference signal comprises at least one of aperiodic channel state information reference signal, additional primary synchronization signal, or additional secondary synchronization signal; and/or wherein the time indicated to perform the at least one of frequency tuning, bandwidth part switching, or bandwidth switching is before or after a reception of the scheduled physical downlink shared channel at the user equipment.

In accordance with example embodiments according to the paragraph above, at least the means for receiving and performing comprises a non-transitory computer readable medium [MEM 23B and/or MEM 21B as in FIG. 5] encoded with a computer program [PROG 23C and/or PROG 21C as in FIG. 5] executable by at least one processor [DP 23A, resource module 23G, DP 21A, and/or Resource Module 21G as in FIG. 5].

BRIEF DESCRIPTION OF THE DRAWINGS

The foregoing and other aspects of some example embodiments will now be described with reference to the accompanying drawings.

FIG. 1 shows an example of possible NR BWs for 4 k FFT and different subcarrier spacing;

FIG. 2 shows exemplary combinations of contiguous transmission BW for gNB, carrier channel BW=80 MHz, sub-band BW=20 MHz.;

DETAILED DESCRIPTION

Figure 3:
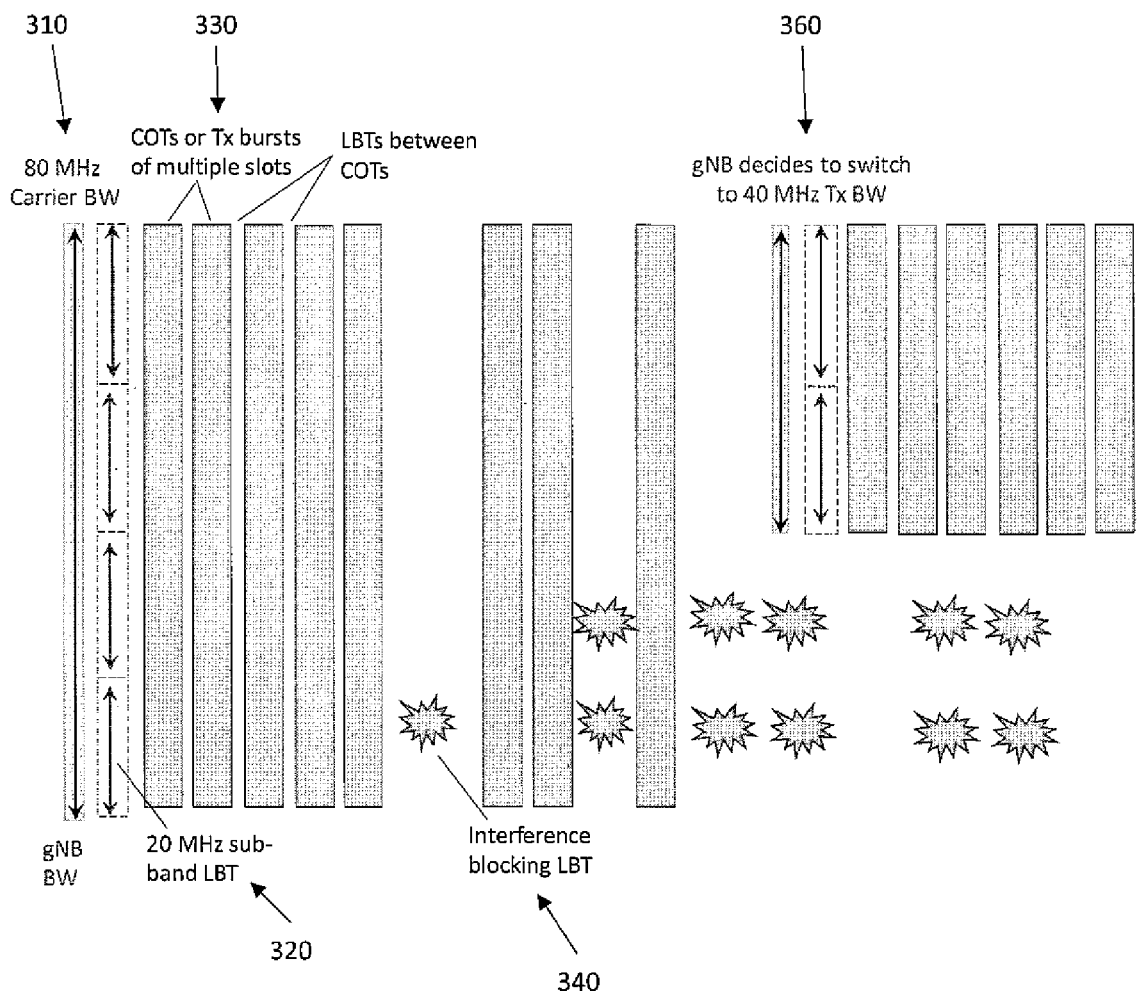
FIG. 3 shows an example of interference avoidance based on dynamic BW adaptation.

In example embodiment of this invention, we propose a method performed by an apparatus to enable user equipment (UE) bandwidth part (BWP) switching for uplink transmission in NR unlicensed (NR-U) band scenario.

3GPP has approved a new study item related to NR-based access to unlicensed spectrum (RP-172021). It is considered that BWP switching may be performed in the case when NR-U cell operates on wideband unlicensed spectrum and may dynamically adjust its BW.

With regards to related listen before talk (LBT) operation on LTE LAA and MulteFire uplink, in LTE LAA, two channel access (LBT) procedures are defined: Type 1 (a variant of Category 4 energy detection LBT procedure) and Type 2 (a variant of Category 2 energy detection LBT procedure):

In Type 1 LBT, UE generates a random number N uniformly distributed over a contention window where the size of contention window depends on the channel access priority class of the traffic. Once UE has measured the channel to be vacant for N times, UE may occupy the channel with transmission. To align the transmission with LTE subframe boundary, UE may need to resort to self-deferral during the LBT procedure.

In Type 2 LBT, UE performs single channel measurement in time interval of 25 microseconds before UL transmission. For PUSCH, this type of LBT may be performed when eNB shares its channel occupancy time (COT) with the LIE. In other words, eNB has contended for the channel and once eNB has obtained access to the channel, it allows UEs to use a portion of its channel occupancy time for UL transmissions.

It is attractive to support UL transmission with Type 2 LBT within gNB acquired COT also on NR-unlicensed, as it supports efficiently scheduled UL as well as LTL FDMA.

In MulteFire, UE may also skip LBT procedure for UL control signalling within eNB acquired COT if UL transmission starts within 16 microseconds after the end of DL transmission.

There are several wide unlicensed bands and even a single gNB or a UE can occasionally access very wide bandwidths. Hence, wideb and operation is one of the key building blocks for NR unlicensed. Both carrier aggregation and BWP mechanisms are supported in Rel-15 NR for wideband operations. NR unlicensed may use both mechanisms to achieve sufficiently versatile support for wideband.

Conventional carrier aggregation offers several benefits, e.g.:
Frequency domain flexibility: aggregated carriers do not need to be adjacent but may be widely apart. This offers e.g. diversity for channel access;
Each carrier may employ its own LBT meaning agile channel access.

Hence, we see that carrier aggregation should be supported for NR unlicensed in addition to facilitating the LAA operation with NR licensed carrier. Of course, carrier aggregation has also its price: multiple RF chains are required, increasing the price of UE transceivers. Additionally, carrier aggregation increases UE power consumption and has rather considerable latency in the component carrier activation/deactivation (which are used to save UE power).

In Rel-15 NR, concept of serving cell adaptive BW was introduced by means of BWPs. In Rel-15 NR, UE is instructed to operate on a specific part of gNB's BW, that is, on a BWP. Up to 4 BWPs can be configured separately for UL and DL. Each BWP can have e.g. separately configured subcarrier spacing (SCS), cyclic prefix, BW in terms of contiguous PRBs as well as location of the BW in the cell's total BW, as well as K0, K1 and K2 values defining the time offsets from DL assignment reception to the beginning of assigned PDSCH, from the end of assigned PDSCH to the associated HARQ-ACK transmission time, and from UL grant reception to the start of PUSCH transmission, respectively. In case of unpaired spectrum (i.e. TDD), UL and DL BWPs can be paired, in which case the centre frequency of both BWPs is required to be the same. One of the BWPs may be defined as default BWP e.g. to facilitate UE battery saving.

In Rel-15 NR, UE may have only one BWP active at a time. Active BWP can be indicated by a field in the DCI or by RRC signalling. BWP switching occurs after UE has received the signalling changing the active BWP, but switching time is yet to be determined. UE may also fall back to default BWP after a configured period of inactivity.

BWP mechanism provides an alternative wideband mechanism (in addition to carrier aggregation) when accessing unlicensed spectrum on adjacent 20 MHz channels as it can provide savings in the UE cost with reduced number of RF chains. Unlike with carrier aggregation, with BWPs single RF chain and FFT processing can be used to access wide bandwidth of e.g. 80 MHz or 160 MHz on 5 GHz or 6 GHz (potential) unlicensed bands. It also improves the trade-off between UE throughput and battery consumption via fast BWP switching. As the BWP switching time is shorter than the component carrier (de)activation time (subject of discussion in 3GPP RAN4), UE can be switched rather aggressively to a narrow BWP (and back to wideband BWP) saving UE battery and compromising throughput less than the slower CC (de)activation in carrier aggregation. On the other hand, NR BWP switching time (hundreds of microseconds, e.g. 600 microseconds according to R4-1803283) has clearly a different order of magnitude than a single CCA (e.g. 9 us) in LBT procedure. This poses constraints on how BWP operation and LBT can interact.

Channel contention mechanism (i.e. LBT) is one of the key components for efficient wideband operation and channel contention mechanism for wideband operations needs to be considered during the SI. It should be noted that both Wi-Fi and LTE LAA LBT operate on 20 MHz channels and some of the regulatory rules, e.g. ETSI's standard, require LBT operation on 20 MHz grid at 5 GHz band. Hence, to meet regulatory requirements and to ensure fair coexistence with other systems, also NR unlicensed should support 20 MHz grid for LBT operation at least for the 5 GHz unlicensed band. Of course, also wider LBT BWs should be supported for higher frequency unlicensed bands or for potential new unlicensed bands such as the 6 GHz band.

For NR-unlicensed wideband (larger than 20 MHz) operation we assume the following exemplary scenario:

Operation in 5 GHz unlicensed spectrum;

A large FFT size (such as 4 k, i.e. size 4096, FFT is assumed for Rel-15 NR). The maximum number of PRBs per BWP inn Rel-15 is 275. The assumption behind is that UE implementation is based on 4 k FFT (275 PRB*12 subcarriers/PRB=3300 subcarriers); and A large SCS, such as 30 kHz or 60 kHz FIG. 2 shows possible combinations of contiguous transmission BW for gNB, carrier channel BW=80 MHz, comprising four sub-bands, each having a BW that equals 20 MHz.

For the purpose of describing example embodiments of the invention, the following terminology is defined:

Carrier bandwidth: the NR carrier bandwidth, such as 40 MHz, 80 MHz or 160 MHz; and Sub-band: one (or possibly multiple adjacent) channel(s) on an unlicensed carrier, typically having a bandwidth of 20 MHz. Sub-band is aligned with the bandwidth of LBT; sub-band may be equal to BW of single LBT (e.g. 20 MHz), or multiple LBT BWs (e.g. 40 MHz), All sub-bands may have the same BW; or there may be combination of different sub-band BWs (e.g. 80 MHz carrier BW may contain e.g. 20+20+40 MHz sub-bands).

FIG. 1 shows possible bandwidth capabilities for such scenario assuming 4 k FFT, where each carrier bandwidth comprises multiple 20 MHz sub-bands. As shown in FIG. 1 there are different NR BWs for 4 k FFT and different subcarrier spacing's. The number "20" denotes a 20 MHz sub-band.

When operating according to unlicensed band regulations in NR-U scenario, gNB must perform LBT before it can start transmitting DL Tx burst in the cell. To meet regulatory requirements and to ensure fair coexistence with other systems, also NR unlicensed should support sub-band LBT, at least with a 20 MHz resolution.

FIG. 3 shows an example of interference avoidance based on dynamic BW adaptation. As shown in FIG. 3 there are different possible transmission bandwidth combinations for gNB after sub-band specific LBT. This example assumes 80 MHz carrier bandwidth, and contiguous allocation of 20 MHz sub-bands. As shown in FIG. 3 there is as shown with identifier 310 a gNB carrier BW of 80 MHz, with 20 MHz sub-band LBT 320. As shown with identifier 330 of FIG. 3 there are channel occupancy times (COTs) or transmission (Tx) bursts of multiple slots, with LBTs (empty gaps) between the COTs. As shown with identifier 340 of FIG. 3 there is interference blocking LBT on some of the sub-bands. In this case, as shown with identifier 360 of FIG. 3 the gNB decides to switch to a 40 MHz Tx BW.

In Rel-15 NR, gNB was assumed to maintain constant BW while UE was instructed to operate on specific BW part, BWP. However, in NR-U, gNB may try to obtain channel access on a wide BW (e.g. 80 MHz) but while performing LBT (or possibly even before LBT) gNB may observe based on sub-band LBT results or some Other measurements that it can gain channel access only on a part of the wide BW. While reducing its BW, gNB may need to adjust the RF configuration (centre frequency, analog and/or digital filters, etc.) in order to meet the regulatory rules defined for the out-of-band emissions, i.e. unwanted transmission to the neighboring channels or sub-bands. gNB may decide on and perform the transmission bandwidth adaptation during or before the LBT process. However, for the purpose of describing example embodiments of the invention, the following terminology transmission bandwidth (Tx BW) is defined as a specific term. With this we mean the part of the spectrum on which gNB actually transmits after LBT. As said, Tx BW may be equal to the carrier BW or be a portion of carrier BW (one or more sub-bands) based on the outcome of LBT. An example of potential interference avoidance based on dynamic BW adaptation is illustrated in FIG. 3.

Although gNB would transmit on a narrower BW than the UE would receive, it does not necessarily require UE to retune its RF to the gNB Tx BW for DL reception—although without RF retuning, UE remains more vulnerable to interference that it receives on its in-band. On the other hand, it might be difficult if not impossible for UE to facilitate rapid retuning of the RF at the time when DL transmission from the gNB starts.

From UL transmission point of view, such flexible BW operation has its challenges:

Prior to the start of DL transmission the UE knows only the wide carrier 13 W (i.e. all sub-bands) on which the gNB may transmit but not the actual transmission BW (Tx BW). So UE will use the wide carrier BW to detect DL transmission burst, and in case the actual transmission BW is less than the carrier BW, the UE may also end up receiving a significant amount of interfering signals from the unused sub-bands.

gNB may share COT only on the Tx BW on which it has acquired channel access. In other words, it may schedule PUSCH with Type 2 LBT only within the BW that it is using in the current DL Tx burst.

Before starting the PUSCH transmission (with Type 2 LBT), UE may need to adapt its BW and centre frequency to correspond to the BW of current DL Tx burst or PUSCH allocation.

However, during the BWP switching UE is not expected to receive DL transmissions. In NR Rel-15 specification. 600 microseconds is one assumption for BWP transition time, not including potential RRM delay following the BWP switch. It should be noted that:

slot duration is 250 microseconds with 60 kHz SCS, and 500 microseconds with 30 kHz SCS, respectively; and LTE LAA eNB may typically run whole Type 1 LBT procedure on vacant channel for Channel Access Priority Class 3 traffic roughly in 200 microseconds.

In other words, a 600 microsecond's gap on a transmission is considerable for unlicensed operations during which the acquired channel access may be lost. Clearly such a long gap in transmission is not desirable.

In NR licensed band operation, UE switches its active BWP based on an indication in a DL assignment or an UL grant (DCI format 0_1 and DCI 1_1), or based on RRC signalling. Rel-15 NR supports BWP switch transition times as agreed on RAN1 #92:

For DCI-based active BWP switch, from RAN1 perspective, the transition time of active DL or UL BWP switch is the time duration from the end of last OFDM symbol of the PDCCH carrying the active BWP switch DCI till the beginning of a slot indicated by K0 in the active DL BWP switch DCI or K2 in the active UL BWP switch DCI;

For timer-based active BWP switch, from RAN1 perspective, the transition time of active DL or UL BWP switch is the time duration from the beginning of the subframe (FR1) or from the beginning of the half-subframe (FR2) immediately after a BWP timer expires till the beginning of a slot UE is able to receive DL signals or transmit UL signals in the default DL BWP for paired spectrum or the default DL or UL BWP for unpaired spectrum In accordance with agreements, a UE is not expected to receive DL signals or transmit UL signals during the transition time of active DL or UL BWP switch.

Rel-15 NR may not provide gNB with sufficient control on UE BWP transition time for efficient NR-U wideband operation:

After sending UL grant with BWP switch, no PDCCH or PDSCH can be scheduled to the UE during the remaining part of DL burst;

In Dual Connectivity LAA and stand-alone NR-U scenarios, UE reports HARQ feedback via NR unlicensed carrier(s). Hence, UE needs to perform BWP switch also for DL assimments. Rel-15 gNB would need to reserve BWP transition time already between DL assignment and PDSCH.

Constructing continuous transmission under such BWP switching related scheduling restrictions complicates scheduling, especially as NR-U cell may serve only few UEs in a COT (due to small cell size). More flexible signalling is desirable to facilitate UE BW adaptation during the DL transmission burst while supporting useful transmission & reception of the signal with only small gaps within the COT.

In NR licensed band operation, UE switches its active BWP based on an indication in a DL assignment or an UL grant (DCI format 0_1 and DCI 1_1), or based on RRC signalling. The limitations of Rel-15 BWP switching were discussed in previous section.

LTE LAA and MulteFire support WB operation only by means of carrier aggregation. As discussed, carrier aggregation assumes separate RF chains for each 20 MHz component carrier. Since LBT resolution is the same as the component carrier bandwidth in both LAA and Multefire there is no issue related to RF retuning at the LTE.

Example embodiments of the invention focuses on a situation where gNB does not obtain channel access on the whole carrier or BW (or a wide BW) on which it performs sub-band based LBT, but only on some (or at least one) of the sub-bands.

Example embodiments of the invention include novel operations using implementation and standard related parts as at least described below.

It is noted that regarding implementation of operations as described herein:

When gNB schedules PDSCH to multiple UEs during the DL burst, it determines the BWP switch (RF tuning) transition times for each UE scheduled to transmit on UL (on PUSCH or PUCCH, or other channels or signals) with type 2 LBT (or no LBT) so that in slot(s) where (at least) one UE is switching BWP (retuning RF), another UE is receiving DL; and/or When gNB schedules PDSCH only to a single UE during the DL burst, and if the same UE is scheduled to transmit on UL, UL transmission is scheduled so that there is a sufficient gap between DL burst and start of UL transmission that is sufficient for both BWP switching (RF retuning) and LBT measurement on vacant channel.

It is noted that example embodiments of the invention use radio frequency (RF) chains. RF chains can be used for multiuser multiple input multiple output (MIMO) systems as well. RF chains can be turned on or off and used to provide a larger capacity and save on energy consumption, such as based on traffic variations. An RF chain is a set or chain of radio frequency components used to receive or transmit signals. In accordance with example embodiments an RF chain is used at least to receive indications of and/or perform frequency tuning, BWP switching or BWP switching was applied to performing, by the user equipment, based on the one or more downlink slots, the at least one of frequency tuning, bandwidth part switching, or bandwidth switching.

It is noted that standard related operations as described herein may include:

When UE is indicated to switch its center frequency and/or BW, or to switch BWP (e.g. as in prior art), it is also indicated when to perform RF retuning or BWP switching:

The indication may be either explicit or implicit;

In addition to UL grants, also DL assignments may include UL BWP switching indication;

In one embodiment, BWP switching time indicator is a flag whether BWP switching is done before or after the assigned PDSCH.

UE may also be dynamically, for example via PDCCH, indicated about presence of additional DL reference signals or instructed to transmit additional UL reference signals to assist BW switching (re-synchronization).

In one example embodiment, the standard related part may be used in combination with the implementation related part.

Figure 4A:
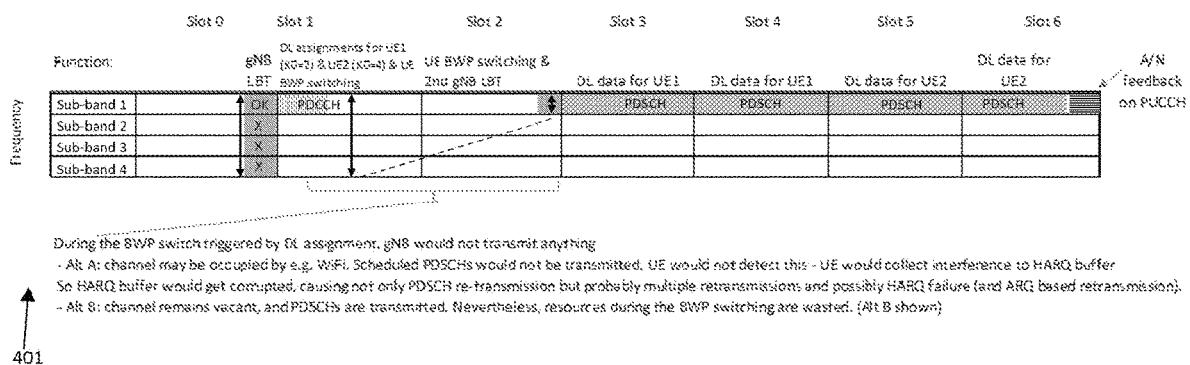
FIG. 4A shows an example of Release 15 bandwidth part switching.

FIG. 4A shows problems with Release 15 bandwidth part switching (BWP). As shown in FIG. 4A, during BWP switching triggered with a DL assignment, gNB would not transmit anything. In this case as shown with identifier 401 alternatives (Alt) exist at least as follows:

Alt A: During the time of BWP switching, the channel may be occupied by e.g., Wi-Fi. PDSCHs in slots 3-6 scheduled via PDCCH in slot 1 would not be transmitted and UE would not detect this. UE would erroneously assume that the PDSCH in slots 3-6 were transmitted, and collect interference to HARQ buffer so HARQ buffer would get corrupted. This would cause not only single PDSCH re-transmission but probably multiple re-transmissions and possibly HARQ failure and ARQ based re-transmission.

Alt B: channel remains vacant, and PDSCHs are transmitted as scheduled. Nevertheless, resources during BWP switching (slot 1 and slot 2) are wasted.

Figure 4B:
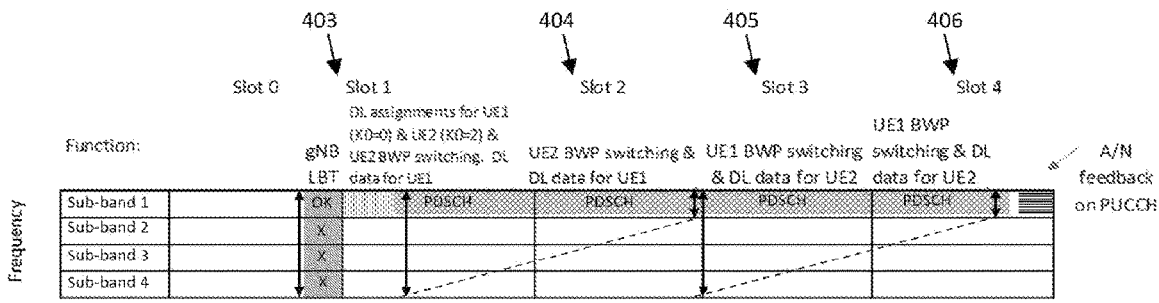
FIG. 4B shows an example embodiment of the described operations related to bandwidth part switching.

FIG. 4B shows operations related to bandwidth part switching in accordance with an example embodiment of the invention. As shown in FIG. 4B at slot 1 403 downlink assignments for UE 1 (K0=0) and UE2 (K0=2), as well as the corresponding PDSCH DL data for UE 1 are transmitted. After receiving downlink assignment, UE2 starts performing BWP switching during slot 1. At slot 2 404 UE2 continues performing BWP switching, while more downlink data (another PDSCH) is transmitted to UE1. At slots 3 405 and slot 4 406 UE1 is performing BWP switching after receiving PDSCH. At slot 3 405 the downlink data assigned to UE2 at slot 1 403 is transmitted to UE2 and more downlink data (another PDSCH) is transmitted to UE2 in slot 4 406.

Figure 4C:
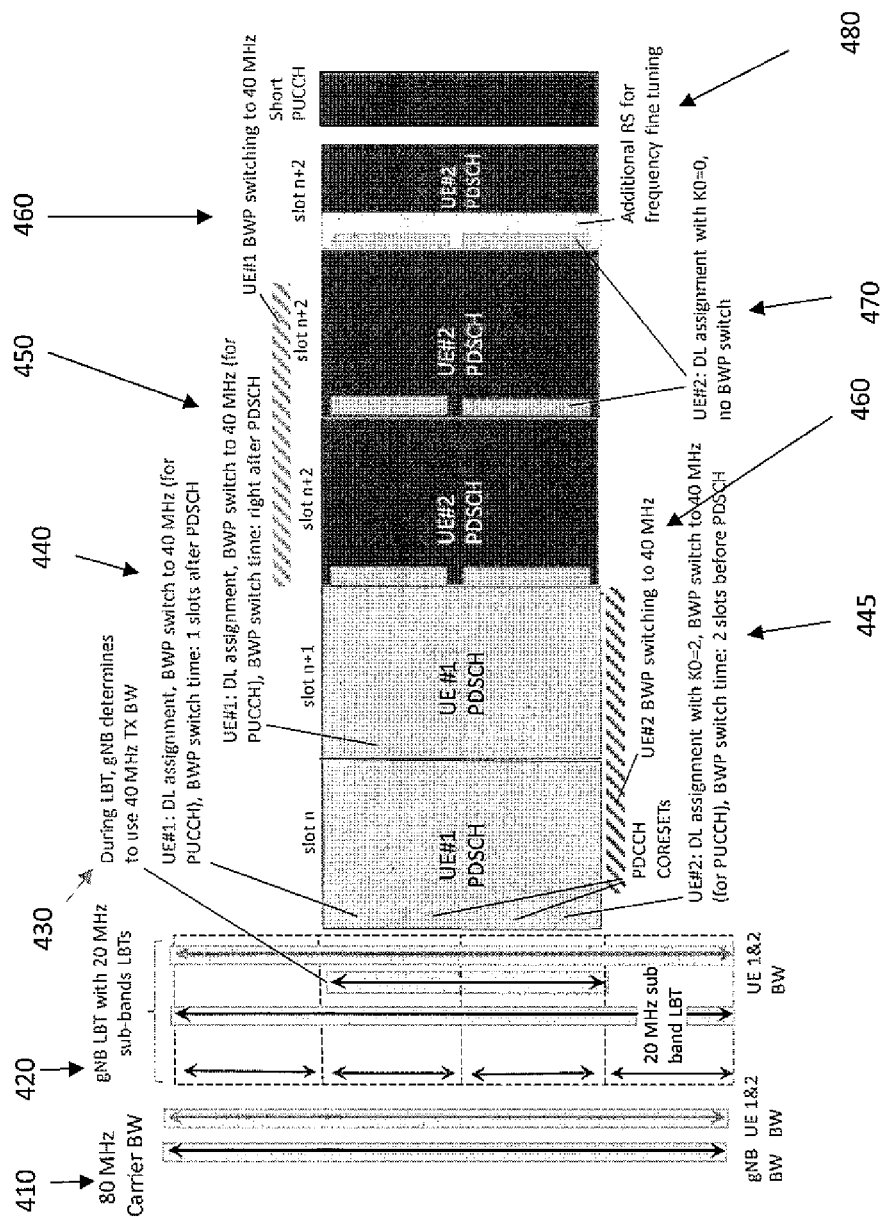
FIG. 4C shows an example embodiment use of subject matter as described herein.

FIG. 4C shows illustration on a use of an example embodiment of the invention. As shown in FIG. 4C there is a gNB and a UE 1&2 operating in an 80 MHz bandwidth (BW) 410. In addition, there is a gNB listen before talk (LBT) with four 20 MHz sub-bands 420. As shown with identifier 430, during LBT, gNB determines to use a 40 MHz transmission (Tx) bandwidth. Then as shown with identifier 440 the UE #1 receive PDCCH in slot n including a downlink (DL) assignment indicating a BW switch. For the UE #1, the DL assignment indicates switching to 40 MHz bandwidth part (for PUCCH transmission) to occur one slot after the reception of a PDSCH in slot n. As shown with identifier 445 the UE #2 receiving the downlink assignment with K0=2, the DL assignment indicates switching to 40 MHz bandwidth part (for PUCCH transmission) to occur two slots before the PDSCH scheduled for slot n+2, i.e. during slots n and n+1. Further, there is as shown with identifier 450 another PDCCH with a DL assignment for UE #1 in slot n+1 scheduling a second PDSCH, the DL assignment indicating the switching to 40 MHz bandwidth part (for PUCCH transmission) to occur immediately after the PDSCH in slot n+1 As shown with identifiers 460 of FIG. 4C, the UE #1 BWP and the UE #2 BWP is switched to 40 MHz during the slots n+2 and n+3. As shown with identifier 470 of FIG. 4C, UE #2 has now performed BWP switching and receives PDCCHs containing DL assignments and assigned PDSCHs with two sub-bands. Then as shown with identifier 480 of FIG. 4C the gNodeB (e.g., gNB) transmits additional RS for frequency and fine tuning.

Explicit indication of BWP switching time may be via e.g. a specific bit field in UL grant/DL assignment DCI, or a GC-PDCCH, or a DCI Format 2_0 or its variant. The field may indicate for example a symbol/slot offset from the first symbol/slot where the PDCCH is received until the start of BWP switching. In the simplest form, it 0 may be indicator in a DL assignment indicating whether the UE should perform BWP switching before or after the PDSCH that the DL assignments schedules, or not to perform BWP switching at all.

The duration of the switching time (or alternatively the ending time of the BWP switching) may be predefined in the specification, configured with RRC signaling based on UE capability or it may be given by the explicit indication. The duration may be defined in terms of microseconds, OFDM symbols, mini-slots and/or slots. The duration may also depend on the value of timing advance indicated to the UE. During the BWP switching the UE may not be able to receive/transmit via the corresponding RF chain(s). After the BWP switching, the UE may continue the DL reception within the COT with a different BW and/or carrier frequency.

There can be several ways to perform implicit indication. For example:
  after receiving DL assignment/UL rant indicating the BWP switch, UE performs BWP switch in first slot(s) for which gNB has not scheduled PDSCH in a previous slot (with K0 value larger than 0);
  UE receiving a GC-PDCCH or DCI Format 2_0 at the beginning of the COT, but not receiving DL assignment for PDSCH for the first slot of the COT may perform the BWP switching during the first slot(s) of the COT;
  Implicit indication of BWP switching time may involve e.g. receiving an UL grant, and determining that BW shall be switched a predetermined, e.g. configured, number of slots or symbols prior to the transmission of the PUSCH that the UL giant schedules;
  Alternatively or additionally, implicit indication of BWP switching time may involve e.g. receiving a DL assignment for PDSCH and a corresponding PDSCH data transmission, and determining that BW shall be switched a predetermined, e.g. configured, number of symbols or slots prior to the transmission of a PUCCH transmission carrying HARQ-ACK for the PDSCH; and/or
  Alternatively or additionally, implicit indication of BWP switching time may involve e.g. receiving DL assignment indicating the BWP switching, and determining that BWP shall be switched before PDSCH if K0 value (that is, the gap between the PDCCH DL assignment, and the PDSCH that it schedules) is large enough to accommodate BWP switching between DL assignment and PDSCH. Otherwise BWP switching occurs after DL assignment, e.g. on time determined by other implicit signaling methods.

Further, it is noted that a transmission to cause operations related to at least frequency tuning, bandwidth part switching, or bandwidth switching is to be performed as according to example embodiments can comprise or include one or more empty symbols or slots, and an uplink portion with one or more uplink slots. However, it is noted that this is not limiting as operations as disclosed herein may also not include any of one or more of these items.

After performing BWP switching and before starting the UL transmission, UE may need to receive additional DL reference signals for its frequency and time fine tuning. UE may use PDCCH and/or PDSCH DMRS for achieving the frequency/time synch required for PDCCH/PDSCH reception. This may require that at least certain DMRS is in a predefined location in frequency and time.

In order to facilitate this:
  gNB may schedule PDSCH (to be transmitted after BWP switching) before the BWP switching (e.g. by means of cross-slot scheduling, or multi-slot scheduling);
  after BWP switching, gNB may use wideband DMRS where DMRS covers the entire CORESET;
  gNB may use predefined (subset of) PDCCH blink decoding candidate(s) for scheduling PDSCH after BWP switching (to make it easier for UE to perform PDCCH blind search under synch error).

In accordance with the example embodiments, tuning as described herein may be an initial tuning or a re-tuning.

Alternatively, gNB may include other additional reference signals to the end of DL burst, e.g. during the last slot of the DL burst, e.g. on the first symbol(s). Further:
  These reference signals may include e.g. CSI-RS, such as aperiodic CSI-RS, aperiodic CSI-RS, or additional PSS/SSS;

The presence of additional DL reference signals may be indicated at the DCI triggering the BWP switch or as part of group common DCI; and/or Having the additional reference signals at the end of DL burst (such that all UEs in the COT have already performed the switching) has the benefit that all UEs performing BWP switching could use the same reference signal for frequency/time fine tuning.

gNB may use conservative link adaptation (i.e. lower MCS than normally) both on DL and UL after BWP switch until UE has received sufficient amount of DL reference signals. When applied on UL, this means that conservative link adaptation is used until next DL burst.

It can be expected that a same BWP setting is used over multiple COTs/transmission bursts, so the BW adaptation is not expected for every COT/transmission burst. Such information can be included e.g. in the DCI (e.g. DL/UL grant, and/or group-common DCI). There can be also a specific timer defined for operation according to "the same BWP setting" over multiple COTs. When the timer expires the UE may again assume a predefined (or default)subband configuration.

It is noted that advantages of the example embodiments of the invention include that there is at least:

allowance to use BWP based BW adaptation on NR-U wideband carriers with less complicated scheduling. Use of BWPs means;

lower implementation cost in comparison to CA based operation;

agile adaptation to changing interference/channel occupancy situations; and reuse of the LBT framework defined for LTE LAA/Multefire also in the case of NR-U based on wideband operation.

In accordance with an example embodiment a network node may contend for the channel and once the network node has obtained access to the channel, it can allow UEs to use a portion of its channel occupancy time for UL transmissions. The transmissions within the channel occupancy time may be seen as a transmission burst comprising a downlink portion transmitted by the network node with one or more slots, possibly one or more empty slots used for example for UL LBT by UE and possibly an uplink portion with one or more or slots containing transmissions from UE or UEs.

Figure 5:
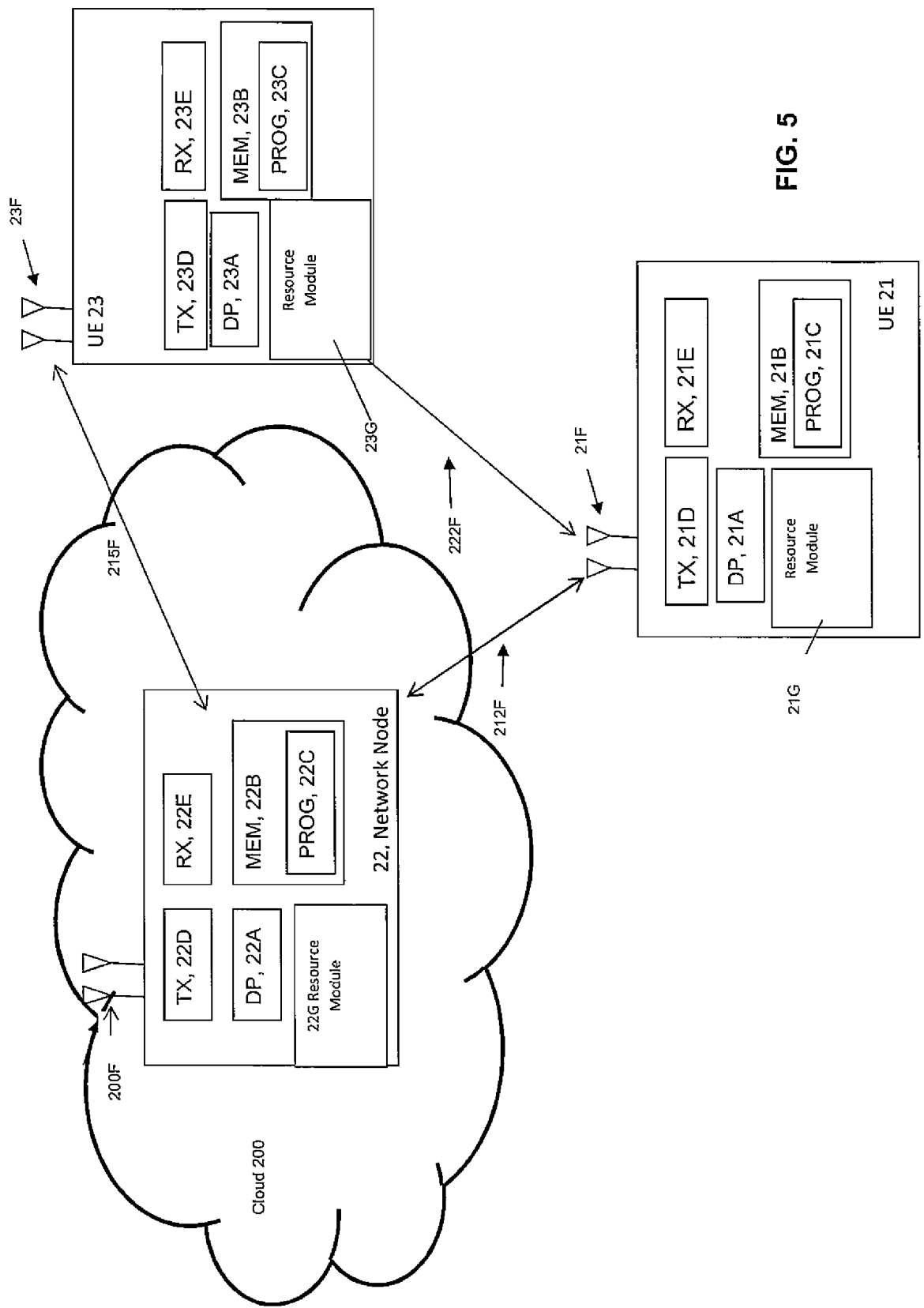
FIG. 5 shows an example embodiment of the subject matter described herein a high level block diagram of various devices which can be used in carrying out various aspects of the subject matter.

Further, for describing devices which may be configured to perform the example embodiments of the invention as described herein, reference is made to FIG. 5 for illustrating a simplified block diagram of various electronic devices that are suitable for use in practicing the example embodiments of this invention. The network node 22 of FIG. 5 can be associated with a communication network cloud 200. The network node can be a base station such as, but not limited to, an eNB, eeNB, or a gNB. The network node 22 includes a controller, such as at least one computer or a data processor (DP) 22A, at least one computer-readable memory medium embodied as a memory (MEM) 22B that stores a program of computer instructions (PROG) 22C, and at least one suitable RF transceiver 22D for communication with the UE 21 via antennas 200F to antenna 21F of UE 21 via the data/control path 212F and/or antenna 23F of UE 23 via the data/control path 215F (several when MIMO operation is in use). The network node 22 is coupled via a data/control path 212F to the UE 21. The path 212F may be implemented such as by a wired and/or wireless connection. The network node 22 can also be coupled to another device, such as another network node e.g., another eNB, eeNB, or gNB for the switching related operations as described herein.

The UE 23 includes a controller, such as at least one computer or a data processor (DP) 23A, at least one non-transitory computer-readable memory medium embodied as a memory (MEM) 23B that stores a program of computer instructions (PROG) 23C, and at least one suitable radio frequency (RF) transmitter and receiver pair (transceiver) 23D for bidirectional wireless communications with the UE 21, the network node 22, and/or another device associated with the cloud via an antenna or antennas 23F, and/or a hardwired connection. In addition the UE 23 may be directly or indirectly connected to the UE 21 such as via a connection 222F.

The UE 21 includes a controller, such as at least one computer or a data processor (DP) 21A, at least one non-transitory computer-readable memory medium embodied as a memory (MEM) 21B that stores a program of computer instructions (PROG) 21C, and at least one suitable radio frequency (RF) transmitter and receiver pair (transceiver) 21D for bidirectional wireless communications with the UE 23, the network node 22, and/or another device associated with the cloud via an antenna or antennas 21F, and/or a hardwired connection. As stated above, the UE 23 may be directly or indirectly connected to the UE 21 such as via a connection 222F.

For the purposes of describing the exemplary embodiments of this invention the network node 22, the UE 21, and/or the UE 23 may be assumed to include a resource module 22G, 21G, and 23G, respectively. The resource module 21G, 22G, and/or the 23G are assumed to be configured to operate in accordance with the example embodiments of this invention as described herein.

At least one of the programs 21C, 22C, and 23C is assumed to include program instructions that, when executed by the associated data processor, enable the device to operate in accordance with the exemplary embodiments of this invention, as discussed herein this application. That is, the exemplary embodiments of this invention may be implemented at least in part by computer software executable by the DP 21A, DP 22A, and/or DP 23A, or by hardware, or by a combination of software and hardware (and/or firmware). Likewise, the resource modules 21G, 22G, and 23G may be configured to perform the BW switching related operations as described herein. The resource modules 21G, 22G, and 23G may be implemented at least in part by executable computer software, or by hardware, or by a combination of software and hardware (and firmware), e.g., the software and hardware as indicated in FIG. 5.

The various data processors, memories, programs, transceivers and interfaces depicted in FIG. 5 may all be considered to represent various means for performing operations and functions that implement the several non-limiting aspects and embodiments of this invention.

In general, the various embodiments of the UE 21 may include, but are not limited to, a server, cellular mobile devices, personal digital assistants (PDAs) having wireless and/or wired communication capabilities, portable computers having communication capabilities, GPS devices, image capture devices such as digital cameras having communication capabilities, gaming devices having communication capabilities, music storage and playback appliances having communication capabilities, Internet appliances permitting wireless Internet access and browsing, as well as portable units or terminals that incorporate combinations of such functions.

The computer-readable memories 21B, 22B, and 23B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 21A, 22A, and 23A may be of any type suitable to the local technical environment, and may include one or more of general purpose computers, special purpose computers, microprocessors, digital signal processors (DSPs) and processors based on multi-core processor architectures, as non-limiting examples.

Figure 6A:
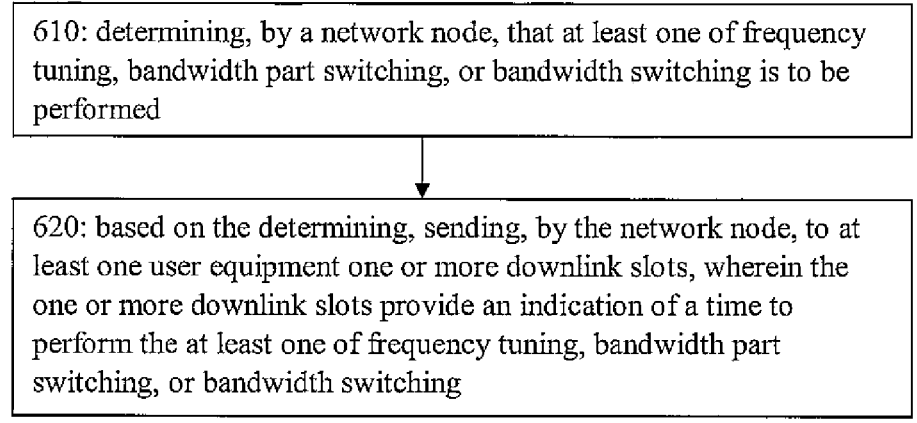
FIG. 6A and FIG. 6B each show an example embodiment of the subject matter described herein a method which may be performed by an apparatus.

FIG. 6A illustrates operations which may be performed by a network device such as, but not limited to, a network node 22 as in FIG. 5 or an eNB, eeNB, or gNB. As shown in step 610 of FIG. 6A there is determining, by a network node, that at least one of frequency tuning, bandwidth part switching, or bandwidth switching is to be performed; and as shown in step 620 of FIG. 6A there is, based on the determining, sending, by the network node, to at least one user equipment one or more downlink slots, wherein the one or more downlink slots provide an indication of a time to perform the at least one of frequency tuning, bandwidth part switching, or bandwidth switching.

In accordance with the example embodiments as described in the paragraph above, the one or more downlink slots are part of a transmission burst, wherein the transmission burst further comprises one or more empty symbols or slots, and an uplink portion with one or more uplink slots.

In accordance with the example embodiments as described in the paragraphs above, the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time, or information of a start time, or an indication of a start time for an uplink part of a channel occupancy time when bandwidth parameters for the at least one of frequency tuning, bandwidth part switching, or bandwidth switching are taken into use.

In accordance with the example embodiments as described in the paragraphs above, the duration indication comprising the gap between the start time and the end time is based on a length of time in terms of at least one of microseconds, OFDM symbols, mini-slots or slots of the one or more downlink slots.

In accordance with the example embodiments as described in the paragraphs above, the time indicated to perform the at least one of frequency tuning, bandwidth part switching, or bandwidth switching is before or after a reception of the scheduled physical downlink shared channel at the at least one user equipment.

In accordance with the example embodiments as described in the paragraphs above, the downlink control information comprises at least one bit field to indicate the time to perform the at least one of frequency tuning, bandwidth part switching, or bandwidth switching.

A non-transitory computer-readable medium (MEM 22B of FIG. 5) storing program code (PROG 22C as in FIG. 5), the program code executed by at least one processor (DP 22A and/or Resource Module 22G as in FIG. 5) to perform the operations as at least described in the paragraphs above.

In accordance with an example embodiment of the invention as described above there is an apparatus comprising: means for determining [DP 22A and/or Resource Module 22G as in FIG. 5] that at least one of frequency tuning, bandwidth part switching, and bandwidth switching is to be performed by at least one user equipment [UE 23 and/or UE 21 as in FIG. 5]; and as shown in step 620 of FIG. 6A there is, means for sending, based on the determining, sending [RS 22E and antenna 200F as in FIG. 5] to the at least one user equipment [LIE 23 and/or UE 21 as in FIG. 5] one or more downlink slots, wherein the one or more downlink slots provide [DP 22A and/or Resource Module 22G as in FIG. 5] an indication of a time to perform the at least one of frequency tuning, bandwidth part switching, or bandwidth switching by the at least one user equipment [UE 23 and/or UE 21 as in FIG. 5].

In the example aspect of the invention according to the paragraph above, wherein at least the means for determining and sending comprises a non-transitory computer readable medium [MEM 22B as in FIG. 5] encoded with a computer program [FROG 22C as in FIG. 5] executable by at least one processor [DP 22A and/or Resource Module 22G as in FIG. 5].

Figure 6B:
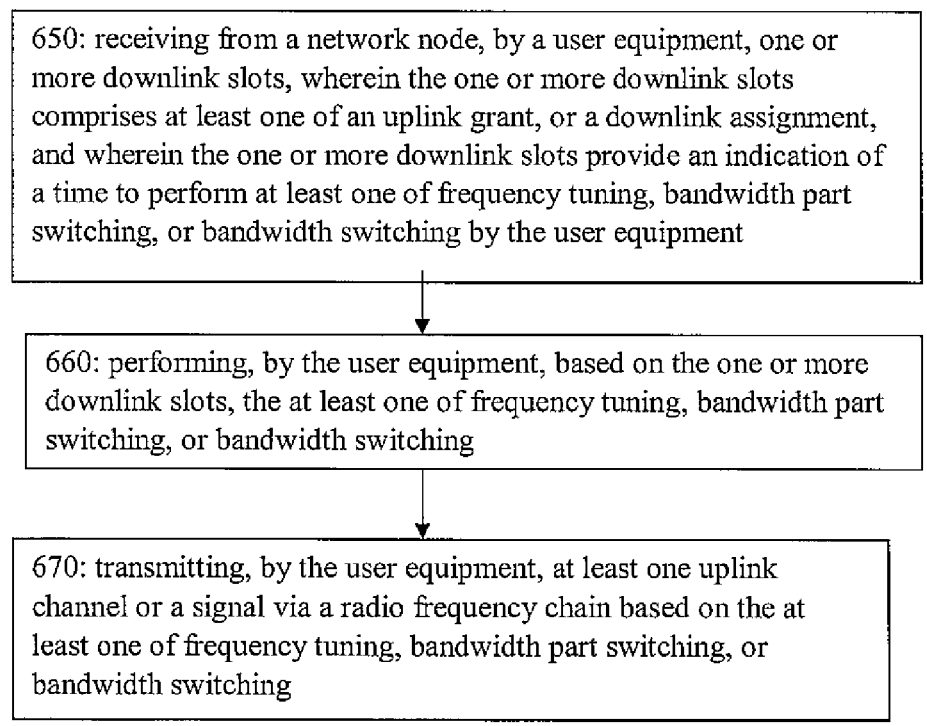

FIG. 6B illustrates operations which may be performed by a device such as, but not limited to, a device [UE 23 and/or UE 21 as in FIG. 5]. As shown in step 650 of FIG. 6B there receiving from a network node, by a user equipment, one or more downlink slots, wherein the one or more downlink slots comprises at least one of an uplink grant, or a downlink assignment, and wherein the one or more downlink slots provide an indication of a time to perform at least one of a frequency tuning, bandwidth part switching, or bandwidth switching by the user equipment; as shown in step 660 of FIG. 6B there is performing, by the user equipment, based on the one or more downlink slots, the at least one of frequency tuning, bandwidth part switching, or bandwidth switching, and as shown in step 670 of FIG. 6B there is transmitting, by the user equipment, at least one uplink channel or a signal via a radio frequency chain based on the at least one of frequency tuning, bandwidth part switching, or bandwidth switching.

In accordance with the example embodiments as described in the paragraph above, the one or more downlink slots are part of a transmission burst, wherein the transmission burst further comprises one or more empty symbols or slots, and an uplink portion with one or more uplink slots.

In accordance with the example embodiments as described in the paragraphs above, the user equipment performs Type 2 channel access procedure prior to transmitting the at least one uplink channel or signal via the radio frequency chain based on the at least one of frequency tuning, bandwidth part switching, or bandwidth switching.

In accordance with the example embodiments as described in the paragraphs above, the user equipment continues receiving, from the network node, a downlink channel or signal after at least one of switching from a first frequency to a second frequency, switching from a first bandwidth part to a second bandwidth part, or switching from a first bandwidth to a second bandwidth until a last downlink slot of the one or more downlink slots.

In accordance with the example embodiments as described in the paragraphs above, the switching from the first bandwidth part to the second bandwidth part comprises using parameters associated with the first bandwidth part until the last downlink slot of the one or more downlink slots.

In accordance with the example embodiments as described in the paragraphs above, the parameters comprise at least one of an uplink grant or a downlink assignment.

In accordance with the example embodiments as described in the paragraphs above, the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching by the at least one user equipment, and wherein the one or more downlink slots further comprise a start time, or information of a start time, or an indication of a start time for an uplink part of a channel occupancy time when bandwidth parameters for the at least one of frequency tuning, bandwidth part switching, or bandwidth switching are taken into use.

In accordance with the example embodiments as described in the paragraphs above, the duration indication comprising the gap between the start time and the ending time is based on a length of time in terms of at least one of microseconds, OFDM symbols, mini-slots, slots.

In accordance with the example embodiments as described in the paragraphs above, there is receiving an uplink grant, and determining that the at least one of frequency tuning, bandwidth part switching, or bandwidth switching shall be performed within a predetermined or indicated number of slots or symbols prior to transmission of physical uplink shared channel that the received uplink grant schedules; or receiving physical downlink shared channel data transmission, and determining that the at least one of frequency tuning, bandwidth part switching, or bandwidth switching shall be performed within a predetermined or indicated number of symbols or slots prior to the transmission of a physical uplink control channel transmission carrying hybrid automatic repeat request acknowledgement for the physical downlink shared channel.

In accordance with the example embodiments as described in the paragraphs above, the one or more downlink slots comprise an indication for at least one user equipment to perform the at least one of the frequency tuning, bandwidth part switching, or the bandwidth switching at least one of before or after reception of a physical downlink shared channel associated to the downlink assignment triggering the at least one of frequency tuning, bandwidth part switching, or bandwidth switching.

In accordance with the example embodiments as described in the paragraphs above, the one or more downlink slots comprise at least one reference signal, wherein the at least one reference signal is used by the user equipment to trigger performing the at least one of frequency tuning, bandwidth part switching, or bandwidth switching based on the at least one of a bandwidth or a position in frequency of the at least one reference signal.

In accordance with the example embodiments as described in the paragraphs above, the last slot of the downlink portion of the one or more downlink slots comprises at least one additional reference signal.

In accordance with the example embodiments as described in the paragraphs above, the at least one reference signal comprises at least one of aperiodic channel state information reference signal, additional primary synchronization signal, or additional secondary synchronisation signal; and, the at least one additional reference signal comprises at least one of aperiodic channel state information reference signal, additional primary synchronization signal, or additional secondary synchronization signal.

In accordance with the example embodiments as described in the paragraphs above, the time indicated to perform the at least one of frequency tuning, bandwidth part switching, or bandwidth switching is before or after a reception of the scheduled physical downlink shared channel at the user equipment.

A non-transitory computer-readable medium (MEM 23B and/or MEM 21B as in FIG. 5) storing program code (PROG 23C and/or PROG 21C as in FIG. 5), the program code executed by at least one processor (DP 23A, resource module 23G, DP 21A, and/or Resource Module 21G as in FIG. 5) to perform the operations as at least described in the paragraphs above.

In accordance with an example embodiment of the invention as described above there is an apparatus comprising: means for receiving [antennas 23F and/or 21F as in FIG. 5] from a network node [Network Node 22 as in FIG. 5] from a network node [Network Node 22 as in FIG. 5], one or more downlink slots, wherein the one or more downlink slots comprises at least one of an uplink grant, or a downlink assignment, and wherein the one or more downlink slots provide [DP 23A, resource module 23G, DP 21A, and/or Resource Module 21G as in FIG. 5] an indication of a time to perform at least one of a frequency tuning, bandwidth part switching, or bandwidth switching by at least one user equipment; as shown in step 660 of FIG. 6B there is means for performing [DP 23A, resource module 23G, DP 21A, and/or Resource Module 21G as in FIG. 5], based on the one or more downlink slots, the at least one of frequency tuning, bandwidth part switching, or bandwidth switching, and means for transmitting [antennas 23F and/or 21F as in FIG. 5] at least one uplink channel or a signal via a radio frequency chain based on the at least one of frequency tuning, bandwidth part switching, or bandwidth switching [DP 23A, resource module 23G, DP 21A, and/or Resource Module 21G as in FIG. 5].

In the example aspect of the invention according to the paragraph above, wherein at least the means for receiving and performing comprises a non-transitory computer readable medium [MEM 23B and/or MEM 21B as in FIG. 5] encoded with a computer program [FROG 23C and/or PROG 21C as in FIG. 5] executable by at least one processor [DP 23A, resource module 23G, DP 21A, and/or Resource Module 21G as in FIG. 5].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of example embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one memory including computer program code, where the at least one memory and the computer program code are configured, with the at least one processor, to cause the apparatus to at least:
   receive from a network node, one or more downlink slots, wherein the one or more downlink slots comprises at least one of an uplink grant or a downlink assignment, and wherein the one or more downlink slots provide an indication of a time to perform at least one of a frequency tuning, bandwidth part switching, or bandwidth switching;
   based on the one or more downlink slots, perform the at least one of frequency tuning, bandwidth part switching, or bandwidth switching, and
   transmit at least one uplink channel or a signal via a radio frequency chain based on the at least one of frequency tuning, bandwidth part switching, or bandwidth switching;
   wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching at the apparatus, and wherein the one or more downlink slots further comprise a start time for an uplink part of a channel occupancy time when bandwidth parameters for the at least one of frequency tuning, bandwidth part switching, or bandwidth switching are taken into use.

2. The apparatus of claim 1, wherein the one or more downlink slots are part of a transmission burst, wherein the transmission burst comprises one or more empty symbols or slots, or an uplink portion with one or more uplink slots.

3. The apparatus as in claim 1, wherein the at least one memory and the computer program code are configured, with the at least one processor, to cause the apparatus to perform Type 2 channel access procedure prior to transmitting the at least one uplink channel or signal via the radio frequency chain based on the at least one of frequency tuning, bandwidth part switching, or bandwidth switching.

4. The apparatus as in claim 1, wherein the at least one memory and the computer program code are configured, with the at least one processor, to cause the apparatus to receive, from the network node, a downlink channel or signal after at least one of switching from a first frequency to a second frequency, switching from a first bandwidth part to a second bandwidth part, or switching from a first bandwidth to a second bandwidth until a last downlink slot of the one or more downlink slots.

5. The apparatus as claim 4, wherein the switching from the first bandwidth part to the second bandwidth part comprises using parameters associated with the first bandwidth part until the last downlink slot of the one or more downlink slots.

6. The apparatus as in claim 5, wherein the parameters comprise at least one of an uplink grant or a downlink assignment.

7. The apparatus as in claim 1, wherein the duration indication comprising the gap between the start time and the ending time is based on a length of time in terms of at least one of microseconds, OFDM symbols, or mini-slots.

8. The apparatus as in claim 1, wherein the at least one of frequency tuning, bandwidth part switching, or bandwidth switching is based on at least one of:
   receiving an uplink grant, and determining that the at least one of frequency tuning, bandwidth part switching, or bandwidth switching shall be performed within a predetermined or indicated number of slots or symbols prior to transmission of physical uplink shared channel that the received uplink grant schedules; or
   receiving physical downlink shared channel data transmission, and determining that the at least one of frequency tuning, bandwidth part switching, or bandwidth switching shall be performed within a predetermined or indicated number of symbols or slots prior to the transmission of a physical uplink control channel transmission carrying hybrid automatic repeat request acknowledgement for the physical downlink shared channel.

9. The apparatus as in claim 1, wherein the one or more downlink slots comprise an indication for at least one user equipment to perform the at least one of the frequency tuning, bandwidth part switching or the bandwidth switching at least one of before or after reception of a physical downlink shared channel associated to the downlink assignment triggering at least one of frequency tuning, bandwidth part switching, or bandwidth switching.

10. The apparatus as in claim 1, wherein the one or more downlink slots comprise at least one reference signal, wherein the at least one reference signal is used by at least one user equipment to trigger performing the at least one of frequency tuning, bandwidth part switching, or bandwidth switching based on the at least one of a bandwidth or a position in frequency of the at least one reference signal.

11. The apparatus as in claim 10, wherein the at least one reference signal comprises at least one of aperiodic channel state information reference signal, additional primary synchronization signal, or additional secondary synchronization signal; and the at least one additional reference signal comprises at least one of a periodic channel state information reference signal, an additional primary synchronization signal, or additional secondary synchronization signal.

12. The apparatus as in claim 1, wherein last slot of downlink portion of the one or more downlink slots comprises at least one additional reference signal.

13. The apparatus as in claim 1, wherein the indication of a time to perform the at least one of frequency tuning, bandwidth part switching, or bandwidth switching is before or after a reception of scheduled physical downlink shared channel.

14. An apparatus, comprising:
at least one processor; and
at least one memory including computer program code, where the at least one memory and the computer program code are configured, with the at least one processor, to cause the apparatus to at least:
determine that at least one of frequency tuning, bandwidth part switching, or bandwidth switching is to be performed; and
based on the determining, send to at least one user equipment one or more downlink slots, wherein the one or more downlink slots provide an indication of a time of the at least one of frequency tuning, bandwidth part switching, or bandwidth switching at the at least one user equipment;
wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching at the at least one user equipment, and wherein the one or more downlink slots further comprise a start time for an uplink part of a channel occupancy time when bandwidth parameters for the at least one of frequency tuning, bandwidth part switching, or bandwidth switching are taken into use.

15. The apparatus as in claim 14, wherein the one or more downlink slots are part of a transmission burst, wherein the transmission burst comprises one or more empty symbols or slots, and an uplink portion with one or more uplink slots.

16. The apparatus as in claim 14, wherein the duration indication comprising the gap between the start time and the end time is based on a length of time in terms of at least one of microseconds, OFDM symbols, mini-slots or slots of the one or more downlink slots.

17. The apparatus as in claim 14, wherein the downlink control information comprises at least one bit field to indicate the time of the at least one of frequency tuning, bandwidth part switching, or bandwidth switching.

18. A method comprising:
receiving from a network node, by a user equipment, one or more downlink slots, wherein the one or more downlink slots comprises at least one of an uplink grant, or a downlink assignment, and wherein the one or more downlink slots provide an indication of a time to perform at least one of a frequency tuning, bandwidth part switching, or bandwidth switching by the user equipment;
performing, by the user equipment, based on the one or more downlink slots, the at least one of frequency tuning, bandwidth part switching, or bandwidth switching, and
transmitting, by the user equipment, at least one uplink channel or a signal via a radio frequency chain based on the at least one of frequency tuning, bandwidth part switching, or bandwidth switching;
wherein the one or more downlink slots comprise a duration indication for the at least one of frequency tuning, bandwidth part switching, or bandwidth switching, wherein the duration indication comprises a gap between a start time and an end time for the at least one of frequency tuning, bandwidth part switching, or bandwidth switching at the apparatus, and wherein the one or more downlink slots further comprise a start time for an uplink part of a channel occupancy time when bandwidth parameters for the at least one of frequency tuning, bandwidth part switching, or bandwidth switching are taken into use.

19. The method of claim 18, wherein the one or more downlink slots are part of a transmission burst, wherein the transmission burst comprises one or more empty symbols or slots, or an uplink portion with one or more uplink slots.

20. The method as in claim 18, wherein the at least one memory and the computer program code are configured, with the at least one processor, to cause the apparatus to perform Type 2 channel access procedure prior to transmitting the at least one uplink channel or signal via the radio frequency chain based on the at least one of frequency tuning, bandwidth part switching, or bandwidth switching.

* * * * *